UNITED STATES PATENT OFFICE.

J. ANDREW HENSHAW, OF CAMBRIDGE, MASSACHUSETTS, ASSIGNOR TO UNION STONE COMPANY.

IMPROVEMENT IN CEMENTS FOR ARTIFICIAL STONES.

Specification forming part of Letters Patent No. 125,390, dated April 9, 1872.

SPECIFICATION.

*To all whom it may concern:*

Be it known that I, JOHN ANDREW HENSHAW, of Cambridge, in the State of Massachusetts, have invented certain Improvements in Cements for Artificial Stones and other purposes; and I do hereby declare the following to be a full and correct description of the same.

These cements are made by mixing a solution of either the silicate of soda or the silicate of potash with the oxide of magnesium, or by mixing a solution of either of these silicates with the oxide of zinc. The proportions taken of the oxide and the silicate to be mixed with it may vary within wide limits, and the solution of the silicate may vary somewhat in density; but I prefer it in the ropy or simpy condition in which it is usually found as an article of commerce.

These cements set in a very short time, and when combined with proper materials make a softer stone than the oxychlorides of magnesium or zinc. They are, therefore, especially suitable for the manufacture of slates and slate-pencils, and similar articles.

In the use of these cements for the manufacture of artificial stone the component parts are not put together by themselves; but the oxide is first mixed with the powdered mineral substance from which the stone is to be made in proportions, say, of from ten to twenty per cent. in weight of the oxide to eighty of the other, and the mixture is then moistened with the solution of the silicate sufficiently to form a mortar, and molded or tamped to form.

I claim—

1. A cement formed from the oxide of magnesium and the silicate of soda or the silicate of potash, substantially as described.

2. A cement formed from the oxide of zinc and the silicate of soda or the silicate of potash, substantially as described.

The above specification of my said invention signed and witnessed at Boston this 23d day of February, A. D. 1872.

J. ANDREW HENSHAW.

Witnesses:
 WILLIAM W. SWAN,
 CHAS. P. GORELY.